(12) United States Patent
Berstis

(10) Patent No.: US 6,674,530 B2
(45) Date of Patent: Jan. 6, 2004

(54) PORTABLE COLORIMETER

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 09/844,388

(22) Filed: Apr. 27, 2001

(65) Prior Publication Data

US 2002/0159065 A1 Oct. 31, 2002

(51) Int. Cl.⁷ .............................................. G01N 21/25
(52) U.S. Cl. ...................... 356/406; 356/407
(58) Field of Search .................. 356/406, 402, 356/407, 408, 425, 448

(56) References Cited

U.S. PATENT DOCUMENTS

| | | | | | |
|---|---|---|---|---|---|
| 5,137,364 | A | * | 8/1992 | McCarthy | 250/226 |
| 5,751,420 | A | * | 5/1998 | Iida et al. | 356/328 |
| 5,844,680 | A | * | 12/1998 | Sperling | 356/302 |
| 6,020,583 | A | * | 2/2000 | Walowit et al. | 250/226 |
| 6,070,018 | A | * | 5/2000 | Matsushita | 396/225 |
| 6,099,185 | A |   | 8/2000 | Huang et al. | 401/195 |
| 6,157,454 | A |   | 12/2000 | Wagner et al. | 356/407 |
| 6,175,693 | B1 | * | 1/2001 | Iida | 396/121 |
| 6,262,804 | B1 | * | 7/2001 | Friend et al. | 235/462.45 |
| 6,271,920 | B1 | * | 8/2001 | Macfarlane et al. | 356/243.5 |
| 6,301,004 | B1 | * | 10/2001 | Jung et al. | 356/406 |
| 6,373,573 | B1 | * | 4/2002 | Jung et al. | 347/19 |

FOREIGN PATENT DOCUMENTS

| | | | | |
|---|---|---|---|---|
| JP | 8332438 | A2 | 12/1996 | B05C/11/10 |
| WO | WO 99/53393 |   | 10/1999 | G06F/3/033 |

OTHER PUBLICATIONS

IBM Technical Disclosure Bulletin, "Photographic Image Computer Analyzer", vol. 29, No. 7, Dec. 1986, pp. 2823–2824.

IBM Technical Disclosure Bulletin, "Color Sensitive Light Pen", vol. 12, No. 11, Apr. 1970, pp. 1960–1961.

Fujieda, I et al., "Development of a Pen–Shaped Scanner and its Applications", Optical Engineering vol. 38, Issue 12, Dec. 1999, pp. 2093–2103.

Fujieda, I et al., "Color Pen–Shaped Scanner", Color Imaging Conference, 5th, Scottsdale, Nov. 17–20, 1997, pp. 131–135.

Haga, H. et al., "Compact Imaging Apparatus for a Pen–Shaped Hand–Held Scanner", Solid State Sensor Arrays: Development and Applications, SPIE Conference, Feb. 10–11, 1997, pp. 168–173.

Fujieda, I et al., "Fingerprint Input Based on Scattered–Light Detection", Applied Optics vol. 36, Issue 35, Dec. 10, 1997, pp. 9152–9156.

\* cited by examiner

Primary Examiner—Karl D. Frech
Assistant Examiner—April A. Nowlin
(74) Attorney, Agent, or Firm—Duke W. Yee; Marilyn Smith Dawkins; Christopher P. O'Hagan

(57) ABSTRACT

A handheld, pen-like colorimeter for measuring the color of an object is provided. The invention includes three light sensors, each of which detects a separate primary color. A microprocessor in the colorimeter calculates a single composite color value from the three separate color measurements from the light sensors and then compares the composite color value with a list of color values, wherein each value corresponds to a unique color name. The colorimeter selects the color name that matches the composite color value of the object presents the color name to a user, using a liquid crystal display (LCD) or an audio speaker. Another embodiment of the present invention uses lasers emitting primary colors, rather than passive light sensors. The lasers shine on an object one at a time, and the reflected laser light from the three lasers is detected by a special light sensor. The three color measurements are then combined to produce a composite value, similar to the first embodiment.

34 Claims, 2 Drawing Sheets

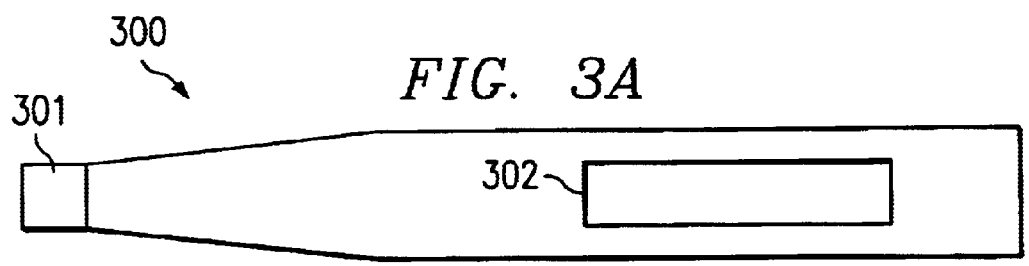
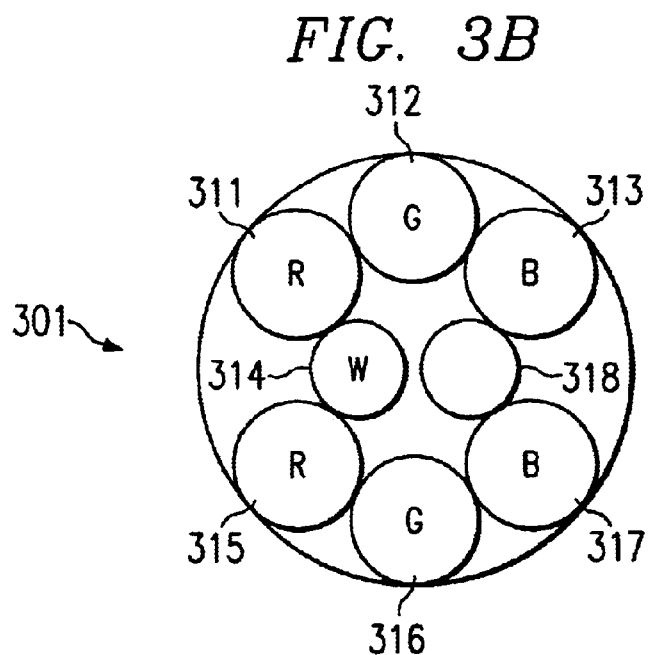

PORTABLE COLORIMETER

CROSS REFERENCE TO RELATED APPLICATIONS

The present application is related to co-pending U.S. patent application Ser. No. 09/844,389 entitled "PORTABLE COLORIMETER" filed even date herewith. The content of the above mentioned commonly assigned, co-pending U.S. Patent applications are hereby incorporated herein by reference for all purposes.

BACKGROUND OF THE INVENTION

1. Technical Field

The present invention relates generally to methods and devices for the measurement of the color of reflected and emitted light, and particularly to a handheld colorimeter.

2. Description of Related Art

Many fields of endeavor require quick accurate measure of the color of objects, or a comparison between objects. In addition, there are many color blind people that have difficulty accurately judging colors to varying degrees. There are also people who may not be color blind, but have simply not learned all of the subtle color variations and names. When these people read books, work on a computer, shop for clothes, etc., they may not always be able to tell the color of the objects at which they are looking.

Currently, handheld colorimeters are available for measuring the color of an object. These devices measure color by placing the tip of the probe against (or in close proximity to) the surface of the object being measured. The colorimeter generates a single measurement from three data points representing the reflectance of the three primary colors red, green, and blue (RGB). The single color value can then be compared to a preloaded table of color values.

However, current handheld colorimeters have several limitations. Current colorimeters cannot measure color at a distance and have problems handling ambient light. Current methods also have problems with changes in the intensity of artificial lights, such as florescent lights. In addition, the prior art requires recalibration by the user upon every use.

Therefore, it would be desirable to have a handheld colorimeter that can measure the color of distant objects and can properly compensate for ambient light, without the need for constant recalibration.

SUMMARY OF THE INVENTION

The present invention provides a handheld, pen-like colorimeter for measuring the color of an object. The invention comprising three light sensors, each of which detects a separate primary color. A microprocessor in the colorimeter calculates a single composite color value from the three separate color measurements from the light sensors and then compares the composite color value with a list of color values, wherein each value corresponds to a unique color name. The colorimeter selects the color name that matches the composite color value of the object and presents the color name to a user, by means of a liquid crystal display (LCD) or an audio speaker.

When the sensors use ambient light to measure the color, a compensation must be made for the coloration of the ambient light. The ambient light is also measured and a white balance measurement is used to correct for the coloration of the light source(s), as is typically done in video cameras and other such devices.

Another embodiment of the present invention uses lasers emitting primary colors, in addition to passive light sensors. The lasers shine on an object one at a time or simultaneously, and the reflected laser light from the three lasers is detected by one or more special telephoto light sensor(s). The three color measurements are then combined to produce a composite value, similar to the first embodiment. The lasers can focus on a very small or larger areas at a distance, permitting color measurements in situations where it may not be convenient to bring the measuring device within close range of the object surface being measured.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 3A and 3B, schematic diagrams illustrating a handheld colorimeter employing both passive color sensors and RGB lasers are depicted in accordance with the present invention.

DETAILED DESCRIPTION OF THE PREFERRED EMBODIMENT

The present invention is a simple pen-like device used to measure the color of reflected light. The pen colorimeter indicates an object's exact color on a liquid crystal display (LCD) on the side of the pen (similar to the displays on clock pens). The invention can be implemented in two ways, depending on the surface being measured. The invention can also be implemented as a combination of both methods.

Figure 1A:
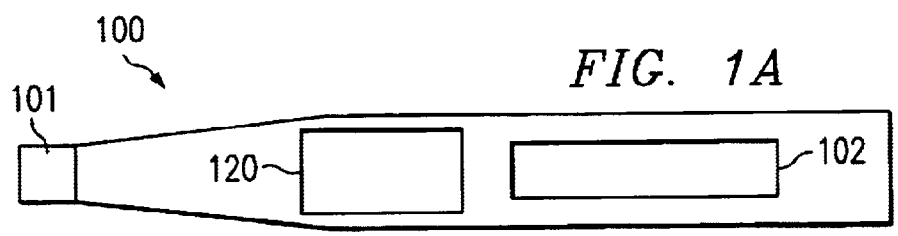
FIGS. 1A and 1B depict schematic diagrams illustrating a handheld colorimeter in accordance with the present invention.
Figure 1B:
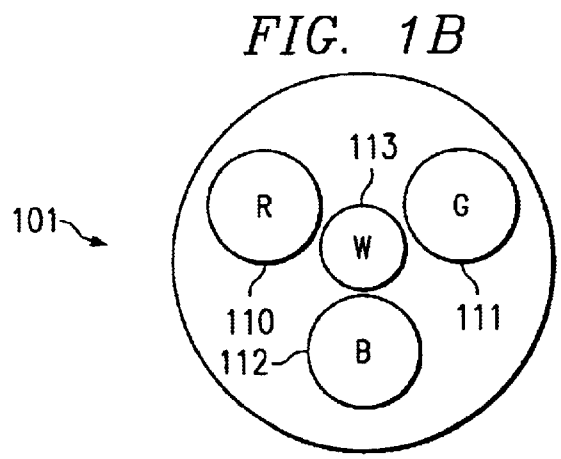

Referring to FIGS. 1A and 1B, schematic diagrams illustrating a handheld colorimeter are depicted in accordance with the present invention. The tip 101 of colorimeter 100 contains three light sensors 110–112, each with an appropriate color filter to measure one of the primary colors. Because red, green and blue are the primary colors of light, all other colors are a composite of these three colors. In the present example, sensor 110 has a color filter that allows it to detect only red light emissions from an object. Similarly, sensors 111 and 112 have color filters for detecting green and blue light respectively. The color sensors can optionally include a small telephoto lens which exposes the sensor to a narrow column of light from the forward direction. The telephoto lenses with color filters on light sensors 110–112 allow colorimeter 100 to measure color at a distance and/or in the presence of ambient light, which is the primary shortcoming in the prior art. Optionally, a white LED 113, may be added to tip 101 for use in close range color measurement if lighting conditions are inadequate.

Colorimeter 100 contains a microprocessor which combines the separate measurements of red, green and blue light to calculate a composite RGB score. This composite score is determined by the intensity and ratio of the three primary colors. The microprocessor then looks up the color name corresponding to the RGB score and displays the name on the LCD display 102 on the side of the colorimeter 100. The color name might also be presented to the user by means of an audio speaker employing Text-to-Speech (TTS) technology. The color names can be stored in a table in internal memory, or in an external source to which the colorimeter 100 is connected.

Prior art colorimeters require the user to recalibrate the colorimeter every time the device is used, using either a white or black surface. The present invention, by contrast, allows the user to maintain calibration in memory, thus eliminating the need for constant recalibration with each use.

The ambient white light balance may have to be measured to correct for uneven spectrums of light sources. This can be accomplished by placing sensors on the side of colorimeter 100 to measure ambient white light, while the color sensors 110–112 simultaneously measure RGB in the forward direction.

In accounting for ambient light, it is especially important to synchronize color measurement with the intensity changes of artificial lighting, such as fluorescent lights. These lights effectively change intensity 120 times per second in countries using 60 hz power, and 100 times per second in countries using 50 hz power. Depending on where in the cycle the measurement is taken, the RGB values detected can be substantially different. Prior art approaches to colorimetry use multiple sequential measurements which are then averaged. Such an approach is directed primarily at compensating for motion of the sensors with respect to the object surface being measured and to compensate for variations from ambient lighting that leak in.

In the present invention, ambient light changes are important when measuring color at a distance. However, non-synchronous averaging measurements, as used in the prior art, limit the accuracy of measurements, which can be critical in diagnostic and quality control applications. The present invention synchronously senses the light fluctuations caused by powers supplies (i.e. 50 hz and 60 hz) and only measures color at the peak intensity of the artificial ambient light, allowing for more accurate and consistent measurements. The white balance measurement can also be made synchronous with the peak intensity of the ambient light. In addition, if the device senses a 120 Hz, 100 Hz, or other similar frequency fluctuation in the light intensity, the device may optionally assume that the lighting is being generated by a fluorescent light source and adjust white balance measurement values accordingly, based on the expected spectrum or set of spectrums typically generated by these sources.

Changes in ambient light intensity may have a different frequency from power lines, such as the light from compact, fluorescent, energy saving "bulbs" which often have their own internal oscillator. This frequency can be used as input to the white balance computation, indicating that the light source is from lighting with spectral content consistent with such "bulbs". In addition, when multiple frequencies are detected, the device may determine that more than one kind of light source exists and compensate accordingly. In general, by measuring the change in spectral intensity with respect to each of the detected intensity modulating frequencies, the device can separate out the relative contribution of incident light from each type of light source.

The present invention may also include a focus option to allow the user to average the colors over a larger area in order to measure the general color of a finely colored or patterned area.

In addition to RGB, the present invention may also measure colors outside the visual spectrum, such as infrared (IR) and ultraviolet (UV). A colorimeter which includes IR or UV may prove useful in medical fields when trying to assess the health of tissues or in agricultural fields when monitoring the health of plants. Other examples include geological application for determining mineral content, especially at a distance, i.e. a rock wall.

Depending on the needs of the client, additional functions may be added to the present invention. One such option is storing measured colors in memory. This would permit the user to annotate the measurement with something as simple as a digit or number, or with something more complex, such as text or a voice clip description. These options may require more powerful microprocessors, extra interface devices (i.e. microphone, keypad, buttons, etc.), and additional memory. However, such additional features and expenses might be reasonable for particular applications (e.g. medical diagnosis or manufacturing quality control).

Another additional function that can be added to the present invention is the use of algorithms to coordinate colors of different objects. The algorithms would tell the user which colors could go with other stored colors in particular situations. An obvious application of this function is wardrobe selection, for both professional as well as home use.

Additionally, functions could translate the color measurement into something other than a color name. The colorimeter may use the color to identify the object being measured. For example, in a clothing store, each kind of garment may have a different possible set of color choices and thus a certain color measurement may translate into "Cambridge rugby shirt" or other appropriate name. As another example, industrial and commercial users may find it convenient to color code component parts and color code package containers according to delivery priority or destination.

Figure 2A:
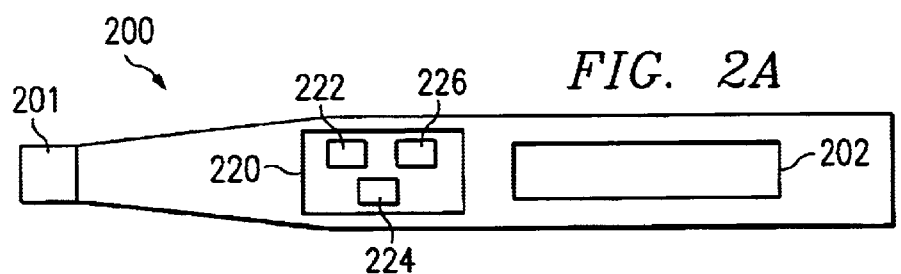
FIGS. 2A and 2B depict schematic diagrams illustrating an active handheld colorimeter in accordance with the present invention.
Figure 2B:
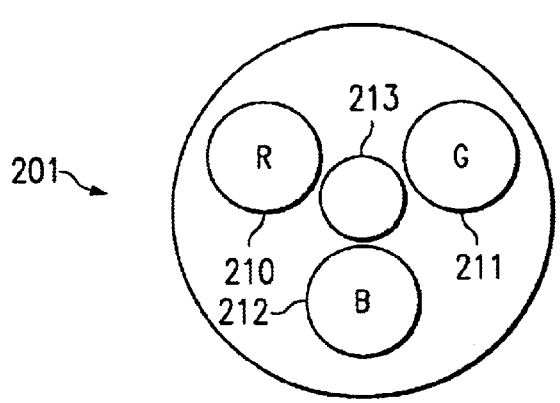

Referring to FIGS. 2A and 2B, schematic diagrams illustrating an active handheld colorimeter are depicted in accordance with the present invention. FIG. 2B illustrates the front of tip 201 which contains the color-measuring components. The basic design of colorimeter 200 is similar to colorimeter 100. However, whereas colorimeter 100 uses passive color sensors 110–112, colorimeter 200 employs RGB laser diodes 210–212. Prior art colorimeters which rely on light emitting diodes (LEDs) cannot measure color at a substantial distance because the LEDs cannot illuminate objects far away. The use of laser diodes in the present invention overcomes this shortcoming because lasers can maintain focused beams over greater distances than prior art, which is why lasers are employed in range finders and targeting systems.

In the present example, laser diodes 210, 211, and 212 emit red, green and blue light (or other appropriate colors suitable for color measurement) respectively. The laser diodes 210–212 shine on the object one at a time, while a photo sensing diode 213 measures the reflected light. A microprocessor inside the body of colorimeter 200 takes the three readings (one for each color) and computes the RGB score, correcting for sensitivity and calibration. The microprocessor then looks up the color name corresponding to the RGB score and displays the name on the LCD display 202 on the side of the colorimeter 200, similar to colorimeter 100.

An infrared laser diode can also be added to colorimeter 200 to extend the color spectrum measured.

Referring to FIGS. 3A and 3B, schematic diagrams illustrating a handheld colorimeter employing both passive color sensors and RGB lasers are depicted in accordance with the present invention. This embodiment of the present invention combines the features of the previous two embodiments. The tip 301 of colorimeter 300 contains RGB laser diodes 311–313 and photo sensing diode 318 as well as RGB color sensors 315–317 and optional white light emitter 314.

The technology represented by the pen-like devices described above may be applied in other handheld formats. For example, the colorimetry technology of the present invention could add color measurement features to digital still cameras and video cameras or camcorders. The user presses a button and moves a target indicator over a part of a recorded image or viewfinder image to choose an item or area for color measurement. This can be accomplished by using the LCD display and scrolling button that typically appear on these cameras. This process works well at a distance, uses the camera's existing white balance capabilities, and allows for more options involving memory and processing. Digital cameras typically include powerful microprocessors to compress the images and large storage devices to hold the images. The camera can also be placed in a mode for continuous color measurement of a central or general portion of the current electronic viewfinder. The text description of the color measurement can be superimposed on the viewfinder image as well as optionally on the recorded image, or on a separate display device on the camera. The text can include the raw RGB values as wells as color names and information comparing the measured color(s) to those previously stored for comparison, matching, or other purposes.

The color coordination and comparison features described above can also be added to video colorimetry and applied to cinematography. Such an application could be particularly important in light of the recent introduction of digital motion picture cameras.

Typically, digital cameras are also sensitive to infrared light and this capability could be better exploited using the present invention to achieve superior results over the current state of the art primarily in medical, or other scientific fields.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A handheld colorimeter for measuring the color of an object, comprising:
   a plurality of light sensors, wherein each sensor detects a distinct color spectra measurement;
   a microprocessor which calculates a single composite color value from the separate color measurements from the light sensors;
   a mapping component which maps the color value to a list of color values and selects a color name from the list that matches the composite color value;
   a presenting component which presents a color identifier to a user; and
   a calibration component that calibrates the colorimeter and maintains the calibration in memory.

2. The colorimeter according to claim 1, wherein the color spectra detected by the-light sensors are red, green, and blue.

3. The colorimeter according to claim 1, wherein the presenting component is a liquid crystal display in a side of the colorimeter.

4. The colorimeter according to claim 1, wherein the presenting component is an audio speaker on the side of the colorimeter.

5. The colorimeter according to claim 1, further comprising an infrared light sensor.

6. The colorimeter according to claim 1, further an ultraviolet light sensor.

7. The colorimeter according to claim 1, further comprising a storage component which stores measured colors in memory, wherein the measurements can be annotated by the user.

8. The colorimeter according to claim 1, further comprising an algorithm to match and coordinate colors of different objects.

9. The colorimeter according to claim 1, further comprising a focus adjuster which adjusts the focus of the light sensors and averages the colors over a specified area.

10. The colorimeter according to claim 1, further comprising a white light emitting diode which shines white light on an object during close range color measurement.

11. The colorimeter according to claim 1, wherein the list of color values and corresponding name is stored in internal memory.

12. The colorimeter according to claim 1, wherein the list of color values and corresponding name is stored in an external memory source.

13. The colorimeter according to claim 1, wherein the light sensors further comprise telephoto lenses.

14. The colorimeter according to claim 1, wherein the colorimeter is incorporated into a camera.

15. A handheld colorimeter for measuring the color of an object, comprising:
   a plurality of light sensors, wherein each sensor detects a distinct color spectra measurement;
   a microprocessor which calculates a single composite color value from the separate color measurements from the light sensors;
   a mapping component which maps the color value to a list of color values and selects a color name from the list that matches the composite color value;
   a presenting component which presents a color identifier to a user;
   an ambient light sensor which measures ambient white light; and
   an adjusting component which adjusts the calculation of the composite color value according to the ambient light measurement.

16. A handheld colorimeter for measuring the color of an object, comprising:
   a plurality of light sensors, wherein each sensor detects a distinct color spectra measurement;
   a microprocessor which calculates a single composite color value from the separate color measurements from the light sensors;
   a mapping component which maps the color value to a list of color values and selects a color name from the list that matches the composite color value;
   a presenting component which presents a color identifier to a user; and
   a synchronizer which synchronizes the timing of color measurements with intensity peaks in artificial ambient light.

17. A handheld colorimeter for measuring the color of an object, comprising:
- a plurality of lasers, wherein each laser emits a different color from the other two lasers;
- a light sensor which detects laser light reflected off an object, wherein the lasers shine on the object one at a time;
- a microprocessor which calculates a single composite color value from the three separate color measurements taken from the reflected laser light;
- a mapping component which maps the color value to a list of color values and selects a color name from the list that matches the composite color value; and
- a presenting component which presents the color name to a user.

18. The colorimeter according to claim 17, wherein the color emitted by the lasers are red, green, and blue.

19. The colorimeter according to claim 17, wherein the presenting component is a liquid crystal display in a side of the colorimeter.

20. The colorimeter according to claim 17, wherein the presenting component is an audio speaker on the side of the colorimeter.

21. The colorimeter according to claim 17, further comprising an infrared laser.

22. The colorimeter according to claim 17, further comprising a storage component which stores measured colors in memory, wherein the measurements can be annotated by the user.

23. The colorimeter according to claim 17, further comprising an algorithm to match and coordinate colors of different objects.

24. The colorimeter according to claim 17, further comprising a calibration component which calibrates the colorimeter and stores the calibration settings in memory.

25. The colorimeter according to claim 17, further comprising a focus adjuster which adjusts the focus of the light sensor and averages the colors over a specified area.

26. The colorimeter according to claim 17, wherein the list of color values and corresponding name is stored in internal memory.

27. The colorimeter according to claim 17, wherein the list of color values and corresponding name is stored in an external memory source.

28. The colorimeter according to claim 17, wherein the light sensor further comprises a telephoto lens.

29. The colorimeter according to claim 17, wherein the colorimeter is incorporated into a camera.

30. A handheld colorimeter for measuring the color of an object, comprising:
- a plurality of lasers, wherein each laser emits a different color from the other two lasers;
- a light sensor which detects laser light reflected off an object, wherein the lasers shine on the object one at a time;
- a microprocessor which calculates a single composite color value from the three separate color measurements taken from the reflected laser light;
- a mapping component which maps the color value to a list of color values and selects a color name from the list that matches the composite color value;
- a presenting component which presents the color name to a user;
- an ambient light sensor which measures ambient white light; and
- an adjusting component which adjusts the calculation of the composite color value according to the ambient light measurement.

31. A handheld colorimeter for measuring the color of an object, comprising:
- a plurality of lasers, wherein each laser emits a different color from the other two lasers;
- a light sensor which detects laser light reflected off an object, wherein the lasers shine on the object one at a time;
- a microprocessor which calculates a single composite color value from the three separate color measurements taken from the reflected laser light;
- a mapping component which maps the color value to a list of color values and selects a color name from the list that matches the composite color value;
- a presenting component which presents the color name to a user; and
- a synchronizer which synchronizes the timing of color measurements with intensity peaks in artificial ambient light.

32. A handheld colorimeter for measuring the color of an object, comprising:
- a plurality of light sensors, wherein each sensor detects a distinct color spectra measurement;
- a plurality of lasers, wherein each laser emits a different color from the other two lasers;
- a laser-light sensor which detects laser light reflected off an object, wherein the lasers shine on the object one at a time;
- a microprocessor which calculates a single composite color value from separate color measurements;
- a mapping component which maps the color value to a list of color values and selects a color name from the list that matches the composite color value; and
- a presenting component which presents the color name to a user.

33. A method for measuring the color of an object, comprising:
- calibrating the colorimeter and maintaining the calibration in memory;
- detecting reflected light by means of three light sensors, wherein each light sensor detects only one primary color, wherein each light sensor detects a different color from the other two light sensors;
- calculating a single composite color value from the three separate color measurements from the light sensors;
- mapping the color value to a list of color values and selecting a color name from the list that matches the composite color value; and
- presenting the color name to a user;
- wherein all steps are performed by a handheld colorimeter.

34. A method for measuring the color of an object, comprising:
- shining three lasers on an object, wherein the lasers emit primary colors, wherein each laser emits a different color from the other two lasers;
- detects the laser light reflected off an object, wherein the lasers shine on the object one at a time;
- calculating a single composite color value from the three separate color measurements taken from the reflected laser light;

mapping the color value to a list of color values and selecting a color name from the list that matches the composite color value; and presenting the color name to a user;

wherein all steps are performed by a handheld colorimeter.

* * * * *

UNITED STATES PATENT AND TRADEMARK OFFICE
CERTIFICATE OF CORRECTION

PATENT NO. : 6,674,530 B2  Page 1 of 1
APPLICATION NO. : 09/844388
DATED : January 6, 2004
INVENTOR(S) : Berstis It is certified that error appears in the above-identified patent and that said Letters Patent is hereby corrected as shown below:

Col. 2, line 62: after "microprocessor" insert --120--.

Col. 4, line 57: after "microprocessor" insert --220--.

Col. 4, line 59: after "correcting for" delete "sensitivity and calibration" and insert --sensitivity at 222 and calibration at 224--.

Col. 4, line 61: after "score" insert --at 226--.

Col. 5, line 66: after "detected by" delete "the-light" and insert --the light--.

Signed and Sealed this

First Day of May, 2007

JON W. DUDAS
*Director of the United States Patent and Trademark Office*